3,061,241
CONTROL MEANS FOR AIRCRAFT IN
POWER-SUPPORTED FLIGHT
Raymond Prunty Holland, Jr., 1702 W. 3rd St.,
Roswell, N. Mex.
Filed Oct. 8, 1956, Ser. No. 614,472
16 Claims. (Cl. 244—23)

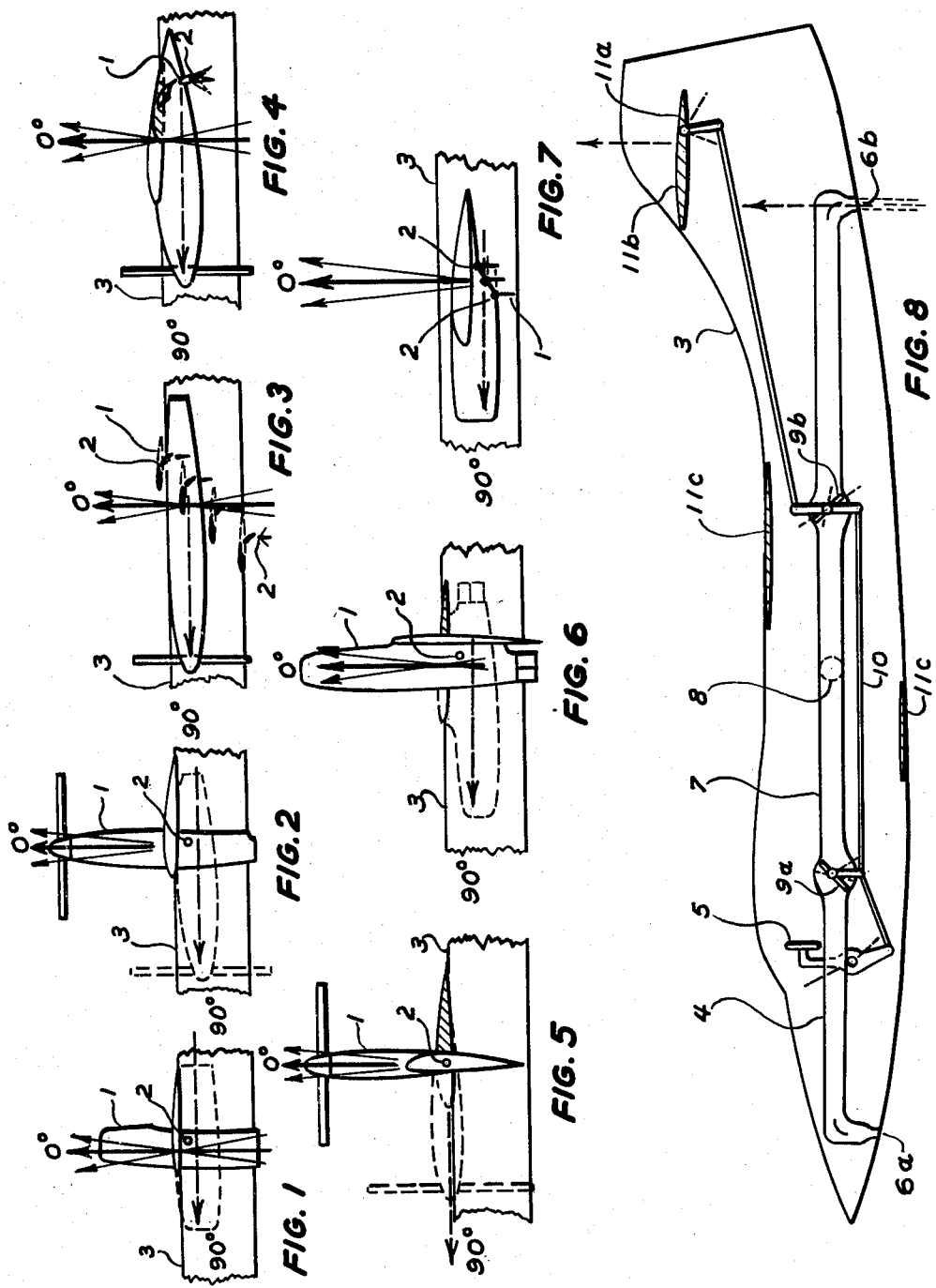

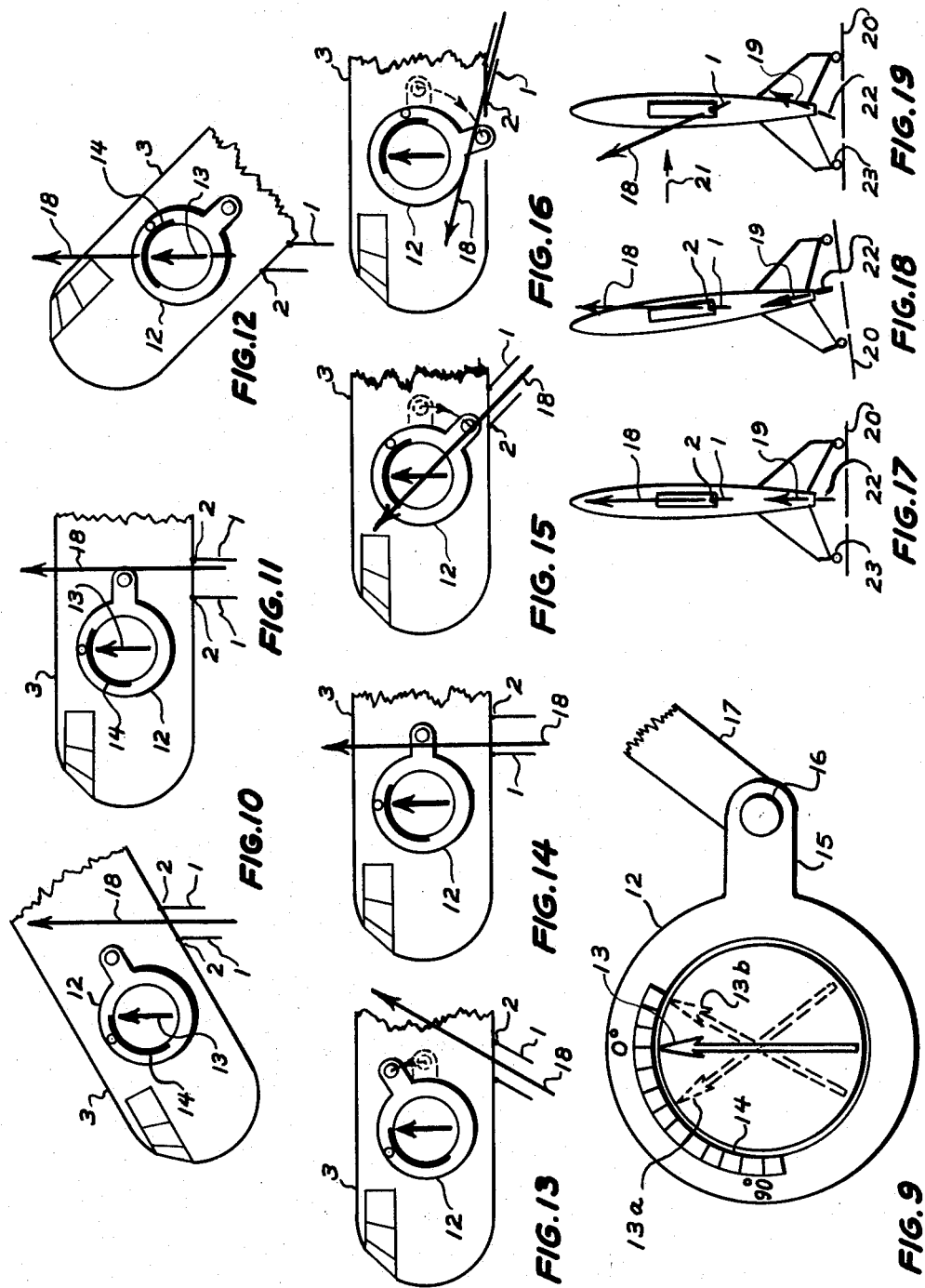

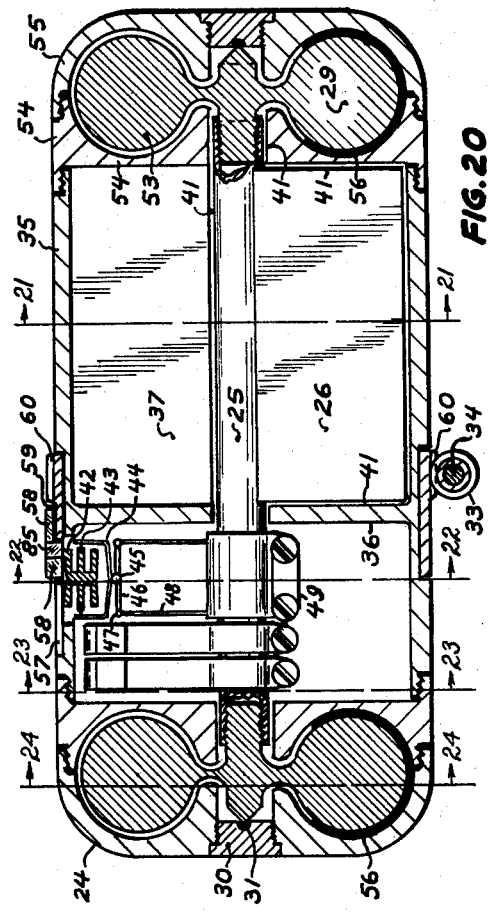

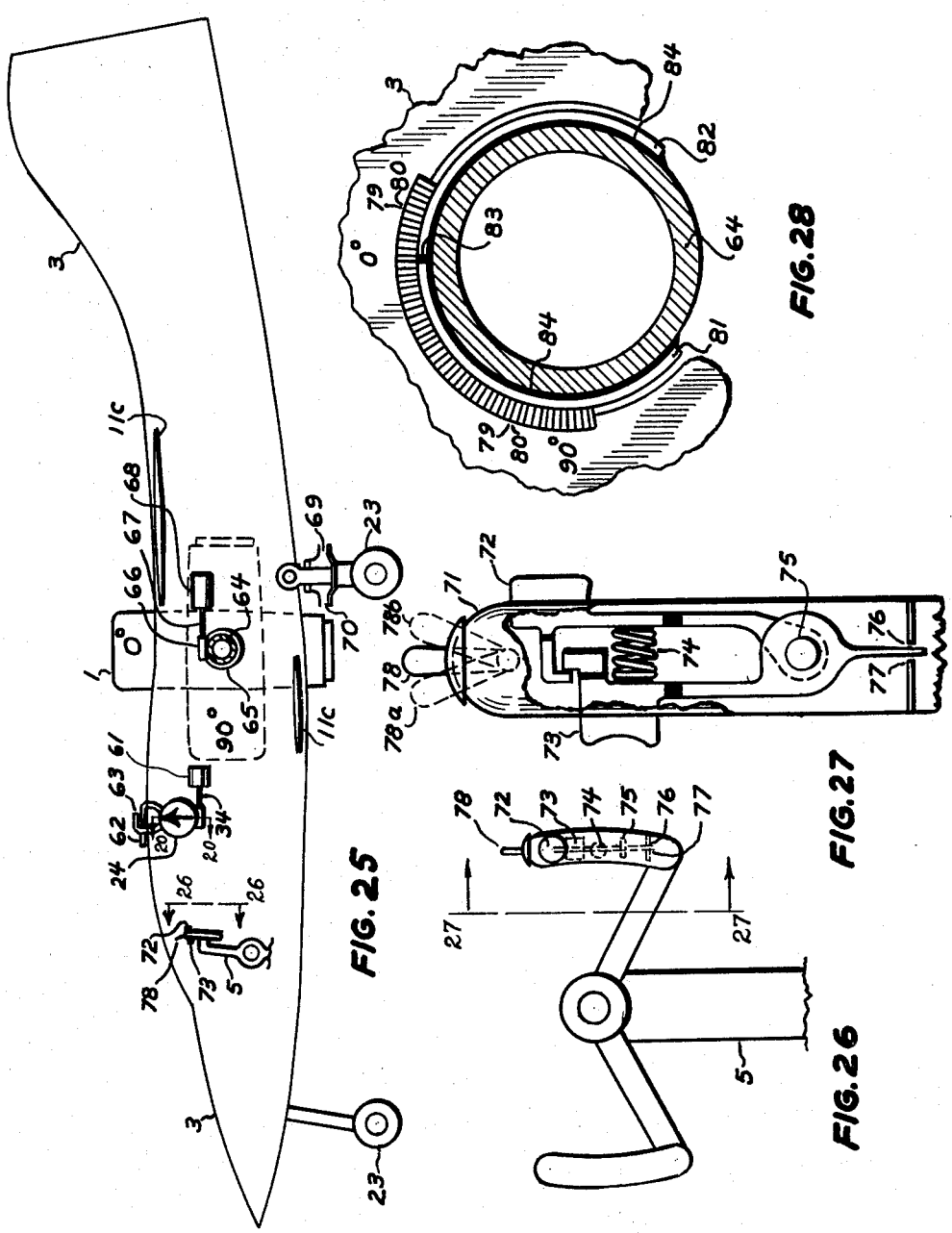

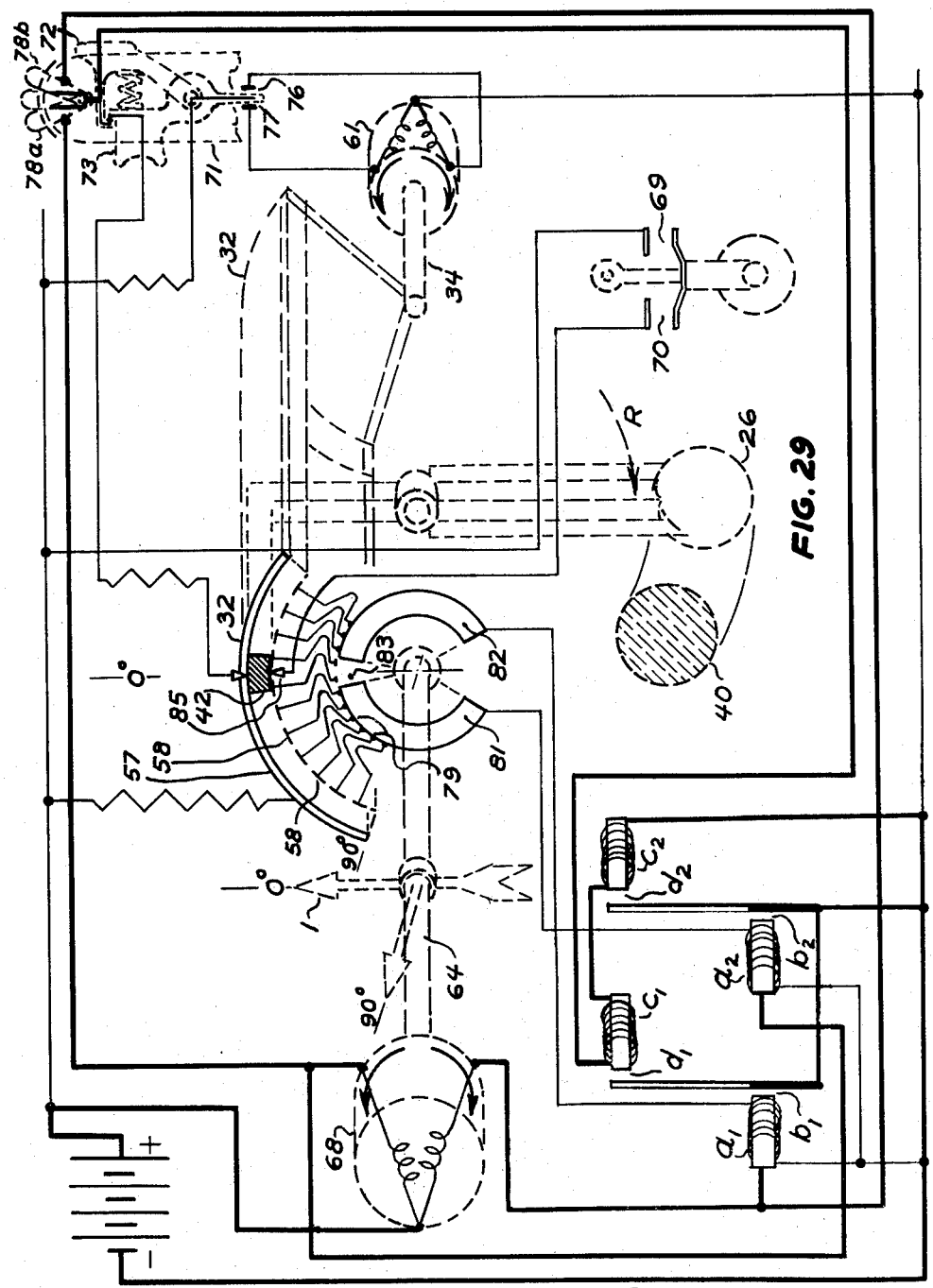

This invention relates to means for controlling aircraft in power-supported flight. For purposes of this specification the term "power-supported flight" means flight in which power is employed to attain an airspeed slower than the slowest airspeed at which the aircraft under discussion can maintain non-accelerated motion in a power-off descent in smooth air. Examples of power-supported flight are hovering flight and low-speed flight transitional to ordinary high speed wing-supported flight.

Heretofore, the piloting of aircraft in power-supported flight has required an excessive number of different control operations producing mixed results in changing directions. This invention corrects this perplexing situation by providing, in addition to the usual engine controls, two simple piloted controls, one to change the angle of attack of the aircraft, and the other to accelerate the aircraft forward or rearward.

At the slower airspeeds in power-supported flight only two major forces act on an aircraft: the resultant powered thrust and the aircraft weight. The aerodynamic forces due to airspeed are negligible. These two forces must be controlled in relative alignment to produce equilibrium and the desired accelerations. In hovering flight a large weight force acts vertically downward, constantly. An equally large powered lift force must balance it perfectly, acting vertically upward. This perfect balance is destroyed the instant the thrust force tilts out of the vertical direction. This misalignment creates an appreciable unbalance of horizontal component of thrust where none existed before, and accelerates the aircraft horizontally in a sensitive manner.

Experience exists with a class of power-supported aircraft identified by its lack of one or the other of two controls: (1) means for adjusting the angle relative to the horizontal of the aircraft landing gear ground contact plane, and (2) means for changing the angle of attack in space of the thrust by an amount controllably different from the simultaneous change of angle in space of the ground contact plane. In this class are helicopters, tail-standing aircraft, flying platforms, and flying barrels. These aircraft experience difficulty when operating from a slope or in a strong wind. It is not possible to bring the alighting base down flat against sloping ground without tilting the thrust off the vertical in the downhill direction, which causes the craft to slide down the slope. Momentarily, during the time when the contact on the ground is heavy enough to tilt the aircraft but not heavy enough to produce sufficient friction force to prevent skidding, the pilot can do nothing to correct the skid. Take-off may be performed abruptly to shorten the skid, but landing must often be performed gradually with the uncontrollable skid occurring over a correspondingly great distance. The same situation exists in a wind when it is necessary to incline the thrust against the wind in order to hold a fixed position over level ground; the landing plane of the aircraft is tilted in this case instead of the ground being tilted, but the relative relationships between ground and landing plane are as before. The present invention corrects these difficulties.

Perfect hovering, with no horizontal movement, has heretofore been difficult to attain in some aircraft and impossible in others because of awkward mechanism between the aircraft proper and its thrust-directing means. These components are often rigidly joined, or they are free only to the extent of permitting occasional incremental changes of relative angle of alignment, pilot operated and relatively cumbersome to control. The mechanism is usually power-driven, irreversible, and subject to a time lag. As a result when the aircraft first tilts in space the thrust resultant tilts with it, and the aircraft is disturbed. This occurs frequently, whenever pitching moments are applied, when the aircraft angle of attack is altered to change wing angle of attack, when weight is shifted as in ground-to-air loading, and when maneuvers and trim changes are performed. At such times unwanted accelerations occur, producing motions troublesome to piloting.

To correct these conditions by conventional means, simultaneous piloted control of both the aircraft attitude in space and the thrust direction relative to the aircraft to maintain a vertical thrust direction would be required. This is psychologically unsound. For intentional tilting of the aircraft two simultaneous control operations would be needed, in opposite directions and with high precision. For correction of unintentional tilting of the aircraft only one of these operations would be necessary, but it would have to control out precisely the unintentional or unavoidable control deviation. It is apparent that a deviation which can not be sensed by the pilot with sufficient accuracy to be avoided in the first place can not be exactly and simultaneously controlled out by the same pilot through a second control means, when that control (being the awkward mechanical drive system for changing relative thrust direction mentioned above) is a coarser and slower control than the first. Conventional means are therefore inadequate.

On certain existing types of aircraft the thrust force is rotated forward or rearward by aerodynamic effects as the ground is approached, with results like landing on a slope or in a wind. For instance, an aircraft which employs large flaps to deflect a propeller slipstream downwardly to obtain vertical thrust commonly experiences a reduced flow-turning effectiveness of those flaps as the approaching ground interrupts the flow-off close beneath the aircraft. The thrust rotates forward and the aircraft accelerates forward, unless a convenient and percise controlling means is available.

Unwanted horizontal velocities in all classes of hovering aircraft commonly give rise to secondary pitching motions and dynamic instabilities. Typically, the aircraft moves forward from its hovering position, and pitches nose-up as it gains velocity. This rotates aircraft and thrust rearwardly together, checks the forward displacement and starts the aircraft rearward. Gaining sufficient speed rearward the aircraft noses down and is once again accelerated forward, repeating the cycle with progressively growing amplitude. It is apparent that difficulties such as these could not occur if the thrust always acted vertically upward.

Other common difficulties, similarly avoidable, occur when a hovering aircraft approaches the ground and enters its own slipstream, deflected by the ground, causing the aircraft to pitch nose-down or nose-up, with corresponding forward or rearward displacements.

Heretofore such difficulties have been tolerated, increasing the burden on the pilot, or have been ignored, or have led to bad practices. Partial solutions have been made piecemeal as though each difficulty were due to a different cause, although it is clear that all are simply different aspects of one basic problem which is solved by the present invention.

Other difficulties would occur at a later stage in the development of power-supported aircraft even if the difficulties encountered thus far were to be corrected piecemeal. Potential difficulties exist in the transition stage between hovering and high-speed wing-supported flight. A need exists for a means of controlling airspeed accurately, and for a control means sufficiently basic and correspondingly versatile to serve during a short running take-off as effectively as during a hovering take-off. These needs are satisfied in the basic solution contained in this invention.

Objects of this invention include the following:

To provide for vertical seeking powered sustentation regardless of transient attitudes assumed by the fuselage.

To provide for modification of the vertical seeking characteristics at the pilot's discretion when horizontal movement of the aircraft is desired.

To provide large static stability of airspeed during power-supported flight.

To produce simple piloting controls for hovering and power-supported flight.

To enable the pilot of an aircraft in power-supported flight, (a) To control the aircraft by operations which require only that attention be directed to the end results, (1) the tilting of the aircraft in space and (2) the attainment and preservation of a desired airspeed, and to remove from his awareness the control of successive steps internal to the overall process.

(b) To alter the aircraft pitching attitude and the resultant thrust direction in pitch individually or simultaneously, in the same or opposite directions, without one materially affecting the other.

(c) To accelerate the aircraft from zero airspeed to any desired power-supported airspeed within the design capability of the aircraft and persist steadily in that selected speed unless controlled to another similarly stable speed, faster or slower.

To permit prolonged controlled hovering in a fixed position over a spot on the ground, in still air or in wind, at any height above the ground and to descend to or rise from full-weight contact with the ground on sloping surfaces as well as level surfaces, without experiencing significant control disturbances.

To permit convenient and psychologically consistent control of power-supported landings and take-offs, either by vertical flight or with a ground run, not only under favorable conditions but in winds and from slopes.

To permit running take-offs to power-supported flight by the process of progressive and automatic elevation of the thrust as forward speed develops.

To provide a system which accomplishes the stated results in hovering and power-supported flight and which goes out of action automatically in wing-supported flight.

Other objects and advantages of the invention will be apparent from the detailed description thereof taken in connection with the drawings, wherein:

FIGURES 1 through 7 are partial side views of various configurations of power-supported aircraft showing various means of rotating the powered thrust resultant in pitch.

FIGURE 8 is a sectional side view of the fuselage of a power-supported aircraft showing means of controlling the fuselage in pitch both during hovering and high speed flight, and showing wing surfaces in fixed horizontal alignment with the fuselage.

FIGURE 9 is a diagrammatic representation in side view of the governing unit which controls the pitching direction in space of the powered thrust resultant, employing an element which senses vertical direction and which is freely rotatable relative to the aircraft and a sensing dial concentric with this element which is pilot-adjustable in angular position relative to the aircraft.

FIGURES 10 through 12 are diagrammatic side views of an aircraft fuselage in various angles of pitch, with the powered thrust resultant direction maintained vertical by the governing unit, without any control action by the pilot.

FIGURES 13 through 16 are diagrammatic side views of an aircraft fuselage in a constant horizontal attitude, with the direction of the powered thrust resultant varied by piloted control rotating the concentric sensing dial relative to the fuselage.

FIGURES 17 through 19 are diagrammatic side views of a vertically-rising tail-standing aircraft showing means for controlling the angle of pitch of both the primary thrust force and the contact plane of the landing gear.

FIGURES 20 through 24 show a low-friction pendulum-operated governing unit employing electrical contact position to signal the desired relative thrusting angle, ram pressure displacement of the pendulum to stabilize forward flight air speed, mercury flotation bearings, circumferential gear drive for piloted thrust angle control, and means of adjusting the viscous damping and the ratio of the pendulum moment arm to the radius of gyration for purposes of adapting the governing unit conveniently to various aircraft having different flight characteristics.

FIGURE 20 is a vertical cross-section through the governing unit on a plane lying transverse to the forward flight direction of the aircraft.

FIGURES 21, 22, 23, and 24 are cross-sections of the governing unit taken on sections 21—21, 22—22, 23—23 and 24—24, respectively, of FIGURE 20.

FIGURE 25 is a partially diagrammatic sectional side view of a power-supported aircraft showing the fuselage, the installation of the governing unit therein, tubes conveying ram pressure to the governing unit, a powered drive system for controlling the governing unit, pilot's control levers, a reaction engine rotatable relative to the fuselage around a transverse pivot, a powered drive system for rotating this engine operated jointly by the pilot's control levers and the governing unit, an electrical contact quadrant sensing the angle of the engine relative to the fuselage, landing wheels, and switches actuated by landing gear deflection.

FIGURE 26 is an enlarged local view at 26—26 on FIGURE 25. It shows the pilot's control column, on the right hand grip of which are located a thumb-operated push-button for rotating the thrust direction forwardly and downwardly in space and a first-finger-operated trigger-like member for rotating the thrust direction upwardly and rearwardly in space operating through the governing unit, and a lever type switch at the top of the grip for operating the rotation of the thrusting engine directly, overriding the action of the governing unit.

FIGURE 27 is an enlarged partial sectional view at 27—27 on FIGURE 26, showing the same parts mentioned above for that figure.

FIGURE 28 is a vertical section through the axis of rotation of the thrusting engine showing the electrical contact quadrant which senses the angle of the engine relative to the fuselage.

FIGURE 29 is a schematic mechanical-electrical diagram of the various mechanisms and circuits.

Basically, the invention consists of devices which put the net resultant thrust force of a power-supported aircraft in the same space-oriented frame of reference as the gravity force, which keep it there so long as the forward air speed is small, which control it relative to that frame of reference to obtain the desired horizontal accelerations, which in addition produce a sensitive stabilizing response to changes of airspeed.

The greatest single force by far which acts on a conventional airplane in ordinary wing-supported flight is the lift force. This force always acts perpendicular to the flight path in the plane of symmetry of the aircraft. Since the flight path can not change direction abruptly, the pitching direction of the lift force can not change direction quickly nor erratically. Its steady directional qualities contribute to the relative steadiness of high speed flight as compared to slow speed flight. To the same degree that flight is power-supported this benefit disappears. In slow flight the steadying effect of aerodynamic damping also disappears. In zero speed totally power-supported flight in low inertia flight systems lacking aerodynamic damping the powered lift force must be steadied in space relative to the gravity force. This is the underlying function of this invention and the basic cure of the numerous flight control difficulties experienced heretofore by thrust-supported aircraft.

In the employment of this invention the use of a control synchro system with electronic voltage amplification would be effective. However, the synchro system performs the functions of several elements of the invention simultaneously. While this may be desirable in an actual installation, it is not instructive for general purposes because it obscures the separate identities of the basic elements. Therefore a version of the invention is described in which the various essential means are separate and explicit.

Referring now again to FIGURES 1 through 7 of the drawings, several thrust-directing means are shown, each consisting of thrust-director 1 rotatable in pitch around one or more horizontal transverse pivot axes 2, relative to fuselage 3.

The source of the powered thrust consists always of a primary powered aerodynamic reaction airstream, such as produced by reaction engines and engine-propeller combinations, including both rigid-blade and articulated-blade propellers, and propellers surrounded by circumferential shroud rings, not shown. In each figure a range of thrusting directions for control during hovering is indicated by solid arrows and the forward thrusting direction is indicated by a dotted arrow. Intermediate positions of thrusting direction including positions thrusting steeply upward, but not so steeply as the perpendicular positions shown, are to be understood to come within the general scope of the descriptions which follow. In FIGURES 1 and 2 the power plants, a jet engine and a propeller engine respectively, rotate bodily while the wing holds a fixed position relative to the fuselage. In FIGURE 3, engine, propeller, and wing leading edges are in fixed positions in pitch relative to the fuselage. Thrust rotation is accomplished by the rotation of multiple trailing edge flaps on a negatively staggered multiplane which in its fully deflected position functions as a cascade of turning vanes which turns the slipstream downwardly to produce upward lift. In FIGURE 4 a monoplane with multiple trailing edge flaps accomplishes similar results typically aided by boundary layer control. In FIGURES 5 and 6, power plant and wing rotate together bodily relative to the fuselage. In FIGURE 7, thrust rotation is accomplished by a directionally controllable outlet grill through which reaction gases escape. In every case, the rotation of the thrust from the thrusting member is accomplished by the rotation of thrust-directing element 1 around pivot 2.

FIGURE 8 shows aerodynamic pitching control means 4 installed in fuselage 3 employing secondary powered aerodynamic reaction air streams to rotate the aircraft in space nose-up or nose-down. When pilot's control column 5 is in neutral no flow passes through either nozzle 6a or nozzle 6b. When column 5 is pulled rearward, flow passes downward through nozzle 6a, elevating the nose of fuselage 3 by reaction. When column 5 is pushed forward, flow passes downward through nozzle 6b, elevating the tail. Dotted lines show positions of members and incremental forces in this latter condition. Gases at a pressure greater than atmospheric typically from engine exhaust or from the primary propulsive stream are ducted to nozzles 6a and 6b through fore-and-aft duct 7 supplied by engine duct 8. The flow is controlled by butterfly valves 9a and 9b actuated by motion-transmitting linkage 10 attached to control column 5. Valves 9a and 9b are mounted so that as one opens the other remains closed. Each is mounted on its pivot with a slight eccentricity such that the pressure due to supply duct 8 acts on each (of the valves 9a and 9b) to produce hinge moments in a direction to open the valve and permit flow. These moments are balanced against each other by the symmetrical arrangement of the valves and by the interconnecting linkage 10. If either valve begins to open the pressure drop across that valve decreases appreciably whereas the pressure drop across the opposite valve, which remains closed, is comparatively unchanged. As one valve opens and its hinge moment decreases, the net hinge moment acting on both valves increases in a direction to close the open valve. The necessary hinge moment to hold one or the other valve open is provided by the pilot pushing or pulling on control column 5. The valves open increasing amounts as the piloting force increases, and the pitching moment on the aircraft increases accordingly. This produces an automatically centering control, and a natural control force variation resembling conventional wing-supported airplane practice. This action exists at hovering, in the absence of forward speed, and gives the pilot control response characteristics resembling those with which he is familiar in ordinary high speed flight. Control linkage 10 also attaches to elevator 11a which contributes to the control of the aircraft in pitch during high speed flight, in a conventional manner. The hinge moments from elevator 11a add to those from valves 9a and 9b during forward flight to cause the pilot's control forces at column 5 to increase relatively as flight speed increases.

FIGURE 8 shows conventional horizontal stabilizer 11b. Wing surfaces 11c lie in a horizontal plane in a fixed position relative to the fore-and-aft axis of fuselage 3, as is desirable to realize the optimum benefits of the invention but is not essential to gain important benefits.

A diagram of a wide angle vertical-direction sensing governing unit 12 is shown in FIGURE 9. Arrow 13 represents a space-oriented vertically aligning sensing element, which may be a pendulum or vertically erecting gyroscope, mounted freely rotatable about a transverse horizontal axis relative to fuselage 3, and holding a constant alignment in space independent of pitching attitudes of fuselage 3. Control arc 14 is concentric with the pivot of arrow 13 and holds a constant angular position relative to fuselage 3 except as controlled therefrom by the means of lever 15, terminating in pivot 16, attaching to push-pull rod 17, which is operated by the pilot. When fuselage 3 is horizontal and pilot's control rod 17 is in its neutral position, the zero degree position on arc 14 lies vertically above the pivot axis of arrow 13, as shown in solid line in FIGURE 9.

When fuselage 3 takes a nose-up attitude with the pilot's control in neutral or when the pilot's control rod 17 is displaced forward and down with the fuselage horizontal, the relative positions of arrow 13 and arc 14 are as shown by dotted arrow 13a. In the reverse directions, in a nose-down attitude or with the control rod displaced upwardly and rearwardly, the relative positions of arrow 13 and arc 14 are as shown by dotted arrow 13b.

Member 13 operates with member 14 to produce signals by any of numerous means indicating the relative angular displacements of arrow 13 from the zero position on arc 14. These signals rotate thrust-directing means 1 around pivot 2, relative to fuselage 3 to a position at which the angle between thruster 1 and a perpendicular to fuselage 3 equals the angle between arrow 13 and the zero position on arc 14. When the arrow 13 is displaced as at relative position 13a, the thrust direction inclines forwardly relative to fuselage 3. When the arrow is at position 13b, the thrust direction inclines rearwardly relative to fuselage 3.

FIGURES 10 through 16 illustrate these actions diagrammatically.

FIGURES 10 through 12 show non-piloted actions with the thrust held at a constant direction and the aircraft at varying pitch angles. The pilot's control rod 17 is in neutral position, and fuselage 3 is in nose-down, horizontal, and nose-up attitudes in FIGURES 10, 11, and 12, respectively. The angle between arrow 13 and the neutral zero degree position on control arc 14 is the same as the pitching angle of fuselage 3 from the horizontal in space, causing thrust direction 18 to remain vertical independently of the attitude of fuselage 3.

FIGURES 13 through 16 illustrate piloted operations involving these same elements but with the fuselage in a constant horizontal attitude and with pilot's control rod 17 operated to obtain rearwardly inclined thrust, vertical thrust, forwardly inclined thrust, and nearly-forward thrust, in FIGURES 13, 14, 15 and 16, respectively.

Because FIGURES 10 through 16 are diagrammatic, and arranged to show functions rather than proportions, the angles of pitch are exaggerated, and pivot 2 is shown in a low position on a deep fuselage. These proportions cause a thrust line movement relative to the aircraft center of gravity which would not exist to nearly as great a degree in an actual case of preferred proportions.

FIGURES 17 through 19 show a tail-standing aircraft employing reaction force 19 for aircraft pitching control, in conditions of a sloping ground surface 20 and wind 21. This aircraft employs the same basic elements as those shown in the preceding figures but illustrates one of a variety of forms which fall within the broader scope of this invention. The differences relative to the preceding are that the fuselage is vertical instead of horizontal, and a single secondary thrusting force at the tail of the fuselage is employed for pitching control instead of one force at the nose and another force at the tail. The basic similarities are that the major thrust force is applied at a relatively small moment arm from the center of gravity and the secondary thrust action which produces pitching control employs relatively small forces at relatively long moment arms.

The direction of force 18 in FIGURES 17 through 19 is controlled as in FIGURES 9 through 16. In still air and on a level alighting surface, as in FIGURE 17, forces 18 and 19 both act vertically and governing unit 12 appears as in FIGURES 11 and 14, except that the fuselage is now vertical. On sloping surface 20 (FIGURE 18) the aircraft is tilted off the vertical, but force 18 is held approximately vertical by the rotation of flap 1 around pivot 2. Governing unit 12 appears approximately as in FIGURE 10. Force 18 acts at a point considered to be beneath the aircraft center of gravity. Consequently force 22 is controlled slightly off the fuselage axis in the opposite direction from force 18 to counteract the pitching moment created by the eccentricity of force 18. In this way the aircraft may be held in trim in the air with each landing wheel 23 an equal distance above sloping ground 20 with no tendency to move horizontally. In a wind, as in FIGURE 19, force 18 is inclined toward the wind by piloted control, independently of fuselage attitude, and force 19 is controlled to a position which cancels eccentric moments due to force 18, eliminating any tendency of the aircraft to translate or rotate in space. Control arc 14 would require only relatively small angles of arc on either side of the zero position for the aircraft in FIGURES 17 through 19, if that aircraft were to fly with its fuselage horizontal at high speeds.

Thrusting forces 18 and 19 can be resolved to an equivalent resultant force acting at the aircraft center of gravity and a resultant couple acting around that center of gravity, and the force and the couple may be made to vary independently of each other, enabling precise trim to be achieved. This is not possible with an aircraft upon which all thrusting forces act at a single point, regardless of where that point is located. A primary thrusting nozzle and any number of controlling nozzles all located at one point at the tip of the tail of a tail-standing aircraft could produce only one resultant force at any instant of time, and that resultant force would uniquely determine the moment acting on the aircraft according to its line of action relative to the aircraft center of gravity.

FIGURES 20 through 24 show a wide angle pendulum-operated space-oriented governing unit 24, having a function similar to unit 12, but including means for stabilization of aircraft forward velocity by means of ram pressure. Governing unit 24 employs central shaft 25 mounted on a horizontal axis transverse to the flight direction, with pendulum 26 serving also as a ram pressure vane, electrical contact roller and arm assembly 27, and pendulum moment arm adjustment weights 28, mounted thereon. The arrows pointing vertically in FIGURES 21 and 22 correspond diagrammatically to vertical sensing member 13 of FIGURE 9. The small arrow at the letter "R" in FIGURE 21 indicates the direction in which an increasing ram pressure due to increasing forward flight velocity displaces pendulum 26. At the ends of shaft 25 are located mercury flotation bearings 29 including threaded bearing mounting plug 30 adjustable axially for holding jewel bearings 31 at proper bearing pressure for steadying and aligning shaft 25 without carrying appreciable stress or weight forces. Weight and vertical acceleration forces are carried with a minimum of static friction by mercury flotation bearings 29. Pendulum 26, as is evident from FIGURES 20 through 24 and from the description above, is an isolated wide angle sensing element. By "isolated" is meant that the pendulum is free of all mechanical restraint in rotation, except a small amount of friction which is unavoidable in practical constructions. By "wide angle" is meant that freedom from restraint exists through very substantial angles of rotation relative to the parts surrounding the pendulum. FIGURE 22 shows such an angle exceeding 120°. In other installations this angle might be much less but nevertheless large as compared to the free range of a pendulum used to stabilize an object in a single fixed attitude. A wide angle of pendulum freedom is required to permit a large range of fuselage positions, nose-up and nose-down, while the pendulum remains vertical and to permit wide angle displacement of adjustable control arc 32 relative to pendulum 26 for forward inclination of the thrust for transition from hovering to high speed forward flight.

Contact arm assembly 27 rotates integrally with shaft 25, in contact at its outer end with control arc unit 32 which is driven in rotation by worm gear 33, driven in turn by pilot-controlled shaft 34 through any desired range of angular positions. These various parts are mounted on and within casing 35, which contains transverse partition 36 normal to the axis of shaft 25 separating the portion of the unit containing ram-pendulum 26 from the portion containing contact arm 27 and pendulum adjustment weights 28. Casing 35 also contains partition 37 above ram-pendulum 26, on the opposite side of shaft 25 therefrom, dividing this region of the casing into two pressure chambers. One chamber lies on the forward side of the unit and the other lies on the rearward or downstream side, relative to the forward motion of the aircraft. At the top of the latter chamber is located boss 38 to which a ram pressure line attaches upon installation in the aircraft. At the top of the relatively forward chamber is located boss 39 to which the anti-ram pressure line attaches, this being the line in which ram pressure would develop if the aircraft were to move rearwardly. These bosses and lines are made abundantly large so as to have insignificant pressure drops due to the flow created by leakage between the two pressure cavities on the two sides of ram-pendulum 26, and to avoid the necessity of unusual machining and assembly precision in keeping clearances small and yet avoiding all contact which would introduce friction. On the inner surface of casing 35, in the anti-ram chamber is located ram-stop 40, which limits the forwardly swinging displacement relative to casing 35 of ram-pendulum 26. To reduce friction, clearance exists around all the moving parts within casing 35 except where contact arm assembly 27 makes very light rolling contact with control arc unit 32. At gaps 41 adjacent to ram-pendulum 26 and where shaft 25 passes out of the pressure chambers, minimum clearance is maintained to avoid unnecessary pressure leakage.

Governing unit 24 senses the vertically acting acceleration due to gravity and horizontal accelerations due to changes of forward velocity, maintains an alignment in space influenced by these quantities, and signals its findings to mechanisms which govern thrust direction relative to the aircraft. Casing 35 mounts rigidly in fuselage 3 with shaft 25 aligned horizontally transverse to the flight direction, with the zero position of control arc 32 vertically above shaft 25 when the pilot's control is in neutral and the fuselage is horizontal. The proportions of control arc 32 as shown in FIGURE 22 are applicable to an installation employing a fuselage in the preferred horizontal ground attitude, as shown in FIGURE 8.

The moment arm from the pivot axis to the center of gravity of the total pendulum system is adjustable by means of pendulum weights 28, which are adjustable in rotation relative to shaft 25. When these weights are mounted vertically above shaft 25, on the opposite side of the shaft from pendulum 26, the moment arm of the system is at a minimum, and yet the moment of inertia of the system around its axis of rotation is undiminished. A large pendulum moment of inertia is desirable to cause the pendulum system to tend to hold constant alignment in space when the casing rotates. The natural frequency of the pendulum is adjustable by adjusting the moment arm; raising the weights relatively reduces the frequency. Sufficient pendulum restoring moment is always needed to restore the pendulum to true vertical under static conditions against the action of unavoidable static friction; this limits the lowest frequency which might be employed. Difficulties from a high frequency pendulum may be reduced by use of a drive system which lags it. To prevent pendulum oscillations without increasing static friction viscous damping forces are available in adjustable quantities by means of adjustable mercury viscous forces, in flotation bearings 29. The basic quantities which influence the behavior of the pendulum are thus all variable either through design for a particular application or through mechanical adjustment to adapt governing unit 24 to a particular aircraft.

Electrical contact roller arm 27 makes very light rolling contact with the inner surface of control arc 32 which is machined accurately concentric with the axis of shaft 25. At zero air speed when control arc 32 is in its neutral position relative to fuselage 3, with the pilot's control in neutral, the point of contact between arm 27 and arc 32 indicates the angle of pitch in space of fuselage 3. When air speed exists, ram pressure superimposes a second incremental displacement between these parts, such that an increase of ram pressure produces a relative displacement between arm 27 and arc 32 in the same direction as the displacement produced when fuselage 3 takes a nose-down change of pitching angle. Both the nose-down change of pitching angle and the increase of air speed, producing identical actions within the governing unit, cause the thrust direction to be tilted rearwardly relative to the fuselage axis, holding the thrust vertical in the case of the tilting fuselage, and tilting the thrust rearwardly to halt the speed increase in the case of an increasing air speed with the fuselage held level.

Piloted control of thrust tilting is accomplished by the circumferential movement of an adjustable position reference member, control arc 32, around casing 35 in the plane of electrical contact roller arm 27, by the action of shaft 34 and worm gear 33. With governing unit 24 in its neutral position, at zero air speed, with fuselage 3 level and the pilot's control in neutral, the position of the parts is as shown in FIGURE 22, and the powered thrust is directed vertically. By rotating control arc 32 counterclockwise as seen in FIGURE 22, the thrust is controlled to incline rearwardly, to a maximum amount in this case of about 30 degrees. Control of arc 32 in the clockwise direction controls the powered thrust to incline forwardly in an amount exceeding 90 degrees. Thus the influences of gravity, mass inertia, air speed, and pilot's will are integrated into governing unit 24 for controlling the thrust direction.

Electrical contact roller arm 27 in detail consists of roller 42 which makes contact with control arc 32, jewel bearings 43 on which roller 42 turns, U-plate bracket 44 which holds roller and bearings, pivot 45 at the center of the U-plate bracket joining it to horizontal suspension arms 46, spring-pivots 47 at the outboard ends of suspension arms 46, supporting arms 48, and clamp 49. These parts hold roller 42 in very light and reliable contact against control arc 32 so as to be rigid in following rotational movements of shaft 25, and flexible in bearing contact on arm 32.

Pendulum adjustment weights 28 consist of weight 50, supporting arm 51, and clamp 52. In FIGURE 23 the solid line shows the position for the slowest natural frequency of internal rotating system, and the positions shown dotted represent settings for a somewhat greater natural frequency.

Whereas the usual flotation-type bearing supports a floating member which is free to rotate around a vertical axis, flotation bearing 29 permits the axis to be in any direction, including the horizontal. Bearing 29 consists of torus spindle 53, inner half of bearing race 54, outer half of bearing race 55 and mercury 56. Torus spindle 53 floats in mercury 56 which is retained by bearing race halves 54 and 55. The surface of torus spindle 53 consists of circular cross-sectional elements concentric with and normal to the axis of shaft 25. Cross sections of spindle 53 in planes containing the axis of shaft 25 narrow down to a thin neck as they approach the extended axis of that shaft. The two halves of the bearing race, 54 and 55, fit closely around torus spindle 53, leaving a narrow gap at all points in which mercury 56 is located. Jewel bearings 31 center the flotation bearing in position, but take no appreciable loads themselves. The supporting force exerted by the bearing due to the action of mercury 56 is of course in the amount of the liquid displaced by torus spindle 53, and is determined as though the entire cavity occupied by the portion of spindle 53 lying below the upper surface of mercury 56 had been filled with mercury and that mercury had been displaced except for the small amount remaining between spindle 53 and races 54 and 55. In this way the actual weight and quantity of mercury employed may be comparatively very small, and yet a considerable weight may be mounted on shaft 25 and may float freely. It is to be observed that the necked-down construction of torus spindle 53 causes mercury 56 to be permanently contained in the bearing regardless of the angle of inclination so long as the unit is not shaken vertically. Flotation spindle 53 may be made as large as necessary to support any necessary amount of weight. When supplied with the correct amount of mercury it supports the weight in conditions of positive vertical acceleration without exerting any force due to that acceleration on jewel bearings 31. The form of spindle 53 may be proportioned to permit a sufficient design range of angle of inclination without causing excessive loads on jewel bearings 31. Even when the axis of governing unit 24 is vertical instead of horizontal, the mercury bearing supports the weight of the pivoted internal portion. The amount of this support is controllable by the geometric design of spindle 53 and races 54 and 55.

Bearing race half 54 is threaded on casing 35, bearing half 55 is threaded on bearing half 54, spindle 53 is threaded in shaft 25, and jewel bearing mounting plug 30 is threaded in bearing half 55. By these means lateral adjustment of these parts may be made for centering and to adjust the forces carried axially at the jewel bearings, and to control the width of the mercury gap surrounding spindle 53 to control the amount of viscous damping. Mercury has approximately the same viscosity as water, and is able to provide significant amounts of fluid damping, which become greater as the film around spindle 53 becomes thinner.

Adjustable control arc 32 consists in detail of a single conductor bus plate 57, multiple conductor plates 58, insulation 59 between plates 58 and around bus 57, and are gear 60. Bus plate 57 is in the form of an accurate segment of an arc mounted in fixed position on casing 35 through the same range of angles as those shown in FIGURE 22 for multiple plates 58. Multiple plates 58 are extremely thin conductor plates lying in radial planes containing the axis of shaft 25, separated from each other and from bus 57 by insulation 59, forming a curved stack of conductors the inner surface of which is accurately machined to the same internal radius of curvature as that on bus 57. This circular arc stack of conductors is rigidly mounted on arc gear 60 which rotates in a machined groove around casing 35 in a position to produce motion in planes normal to the axis of shaft 25 when arc gear 60 is driven by worm gear 33 as adjustably controlled by the pilot. Roller 42 makes contact with bus 57 at all times, at its left side as shown in FIGURE 20. At its right side roller 42 makes contact at all times with one or more of conductor plates 58, preferably not touching more than two at any one time. Electric current is then able to pass between bus 57 and the particular plates 58 touching roller 42. Plates 58, being very thin and closely spaced are located at small angular spacing so that control is accomplished in small angular increments.

In FIGURE 25 are shown governing unit 24 represented diagrammatically as a circle with a vertical arrow diametrically thereon, together with reversible drive motor 61 turning shaft 34, under the control of the pilot. Attached to bosses 38 and 39 are ram tube 62 and anti-ram tube 63, respectively. These are preferably of short length and run to points on the exterior of the aircraft where they open forwardly and rearwardly respectively in positions of unobstructed air flow free from slipstream or powered flow during slow flight. Alternatively in installations intended for forward flight only anti-ram tube 63 may open within a venturi tube or a point of strong negative pressure on the exterior of the aircraft, to intensify the suction effect. When appreciable rearward velocities are to occur the dissymmetry of a negative pressure device such as venturi tube is to be avoided, in the interests of obtaining a speed-stabilizing action into the negative air speed conditions.

Means of rotating a typical thrust-directing means 1 is shown in FIGURE 25 in which laterally transverse pivot member 64 turns integrally with reaction engine 1 and is driven in rotation relative to fuselage 3 and by gear 65 circumferentially mounted around axle 64, driven in turn by worm gear 66, rigidly attached to shaft 67, which is turned by reversible motor 68, ground pressure acts controlled by governing unit 24.

At one of the landing wheels 23, located in a position where it normally carries a relatively large portion of the aircraft weight, are located switches 69 and 70. These are closed when sufficient ground pressure acts on the landing wheel to provide traction against the ground and prevent skidding. They are open when the aircraft approaches the airborne condition, and remain open in flight unaffected by gear retraction. These switches distinguish between the airborne and the ground-borne conditions and permit the automatic alignment and stopping of the thrust normal to the fuselage in the ground-borne case, as is useful preparatory to a vertical take-off, but they prevent any such stopping of the thrust once the aircraft is airborne. These actions are described at the discussion of FIGURE 29 under Take-off.

On the right hand grip 71 of pilot's control column 5 are located thumb press member 72 and finger trigger member 73 pivoted in common at pivot 75, and held in a position of mutual electrical contact by spring 74. Pressing 72 and 73 toward each other breaks this contact. At the flexible lower extremity of member 73 are switches 76 and 77. Switch 76 is closed when button 72 carries pressure and trigger 73 does not; switch 77 is closed whenever trigger 73 carries pressure. Switches 76 and 77 are held open by means of springs, not shown, which hold member 73 in a central position in the absence of distinct pressure on either 72 or 73. Also employed is a click mechanism, not shown, which gives the pilot positive information which he can sense in his fingers when either switch 76 or switch 77 opens or closes. By means of switches 76 and 77 the pilot tilts the thrust, running it forwardly and down by pressing thumb button 72, and running it upwardly and rearwardly by pulling trigger 73, operating through reversible motor 61, shaft 34, worm gear 33, and control arc 32, to change the position of control arc 32 relative to roller 42, the position of which is governed by pendulum and air speed effects previously described. At the top of pilot's hand grip 71 is located pilot's override switch 78, having position 78a which causes the thrust direction to rotate forwardly and position 78b which causes the thrust direction to rotate rearwardly. This action operates directly on motor 68.

FIGURE 28 is a section on a vertical plane extending fore and aft through fuselage 3. The position of thrust directing means 1 relative to fuselage 3 is sensed by multiple conductor plates 79 and multiple insulator plates 80 arranged alternately and lying in radiating planes containing the axis of rotation of axle 64 forming a wide angle sensing arc, which is mounted rigidly on the structure integral with fuselage 3. Mounted rigidly around axle 64, concentric with it, are conductor bus plates 81 and 82. Between these two plates is a narrow insulated gap 83, having a total spread sufficient to contain two of the conductor plates 79, in order that at least one conductor plate 79 will be opposite non-conducting gap 83. All other conductor plates 79 make contact with either bus plate 81 or bus plate 82. Between axle 64 and bus plates 81 and 82 is insulation 84.

When electric current passes between one of the conductor plates 58, through roller 42 to bus plate 57 (these parts being on control unit 54), power plant 1 is rotated on axle 64 by motor 68, shaft 67, and gears 66, and 65, until insulating gap 83 occupies the same angular position relative to the arc composed of plates 79 that conducting roller 42 occupies relative to the arc composed of conducting plates 58. Each conducting plate 79 is attached by an interconnecting wire to the particular conducting plate 58 which occupies a corresponding angular position in the respective arcs.

FIGURE 29 shows the electrical-mechanical schematic diagram of this action. Shown in this diagram, in control arc 32 on control unit 24, is a uniquely wired conductor plate 85, located at the true vertical zero position. Plate 85 may be seen also in FIGURES 20 and 22. The function of plate 85 is to stop thruster 1 normal to the fuselage when the aircraft is on the ground, as described under Take-off below.

On FIGURE 29, solenoids designated "a" close switches "b" when their coils carry current, and solenoids "c" close switches "d." Solenoids "c" produce stronger moments than solenoids "a," closing switches "d," and holding switches "a" open. Subscripts "1" and "2" identify locations as shown. Mechanical features may be identified by number, which are the same as those used elsewhere in this specification. The markings 0° and 90° at thrust directing means 1 and at control arc 32 correspond to similar markings shown in FIGURES 1 through 7, 9, 22, 25, and 28.

The schematic diagram (FIGURE 29) is drawn with the parts in the relationships they would have with fuselage 3 in a horizontal position, at zero airspeed, and with the thrust control position vertical. The marking 0° indicates a position vertically upward, and the marking 90° indicates a forward direction. Parts which are fixed rigidly in the structure of fuselage 3 include the mountings of motors 61 and 68, ram stop 40 for pendulum 26, conductor plates 79, and all pivot axes. Major groups which move together as units include: pendulum 26 and roller 42; control arc 32 and conductor plates 58; and thrust-directing means 1, conductors 81 and 82, and gap 83. The angular spacing between conductor plates 58 and between conductor plates 79 is greatly exaggerated. Items of a conventional nature not shown in FIGURE 29 include a main switch and suitable limit switches to stop the powered operation of the various parts upon reaching the ends of their respective travels.

The various operations of the invention may now be traced through in detail with the aid of FIGURE 29:

*Flight at zero airspeed.*—Fore-and-aft operation of control column 5, or contact with ground having a slope in pitch, or other similar sources of pitching moment, cause no other result than to pitch the aircraft. Pendulum 26 constantly hangs vertically. When the aircraft pitches clockwise as seen on FIGURE 29, pendulum 26 rotates counterclockwise relative to the aircraft, electrical contact member 42 moves to the left, electric current flows to bus 57, through 42, to plate 58, to plate 79, to conductor arc 81, through solenoid coil $a_2$, closing switch $b_2$, causing current to flow in the power circuit, turning motor 68 counterclockwise, turning shaft 64, carrying thrust directing means 1 and conductor arcs 81 and 82 counterclockwise, bringing gap 83 opposite the particular plate 79 which is connected by wire to the particular plate 58 which is in contact with contact member 42, thereby interrupting the current and stopping the action, with thrust-directing means 1 vertical, parallel to vertically-aligning pendulum 26. Except for a time-lag which can be made small in design, the thrust direction stays constant in space.

*Flight at small constant airspeed.*—Due to a constant forward air speed pendulum 26 is displaced from the vertical by a constant angular amount due to ram pressure, indicated by the letter R on FIGURE 29. Contact member 42 is displaced thereby relatively to the right. In compensation, to restore the necessary forward component of thrust, control arc 32 is controlled by the pilot in a clockwise sense in an amount exceeding the clockwise displacement of pendulum 26, bringing thrust-director 1 forward of the vertical. From this position as a neutral point with the fuselage horizontal, the aircraft may nose-up or nose-down due to any cause whatever, and the thrust will hold a constant heading in space, by an action like that described in the paragraph above.

*Power-supported flight with forward airspeed.*—In aircraft employing horizontally-arranged wings 11c forward air speed acts with changes of pitching angle of attack to cause changes in the amount of aerodynamic wing lift. When the aircraft noses up the total lift increases, the flight path through the air bends upwardly and the aircraft rises, limited by wing stall, as in a conventional fixed wing airplane. When the aircraft noses down, the reverse effects occur. The pilot is able to fly the plane in a conventional manner using the control column alone, even though virtually all the weight is power-supported. At slow air speeds the influence of the wing is very small, disappearing entirely as zero air speed is reached. At fast air speeds approaching those at which the aircraft is able to fly in pure wing-supported flight, the wing effect predominates. A progressive transition in flying qualities occurs, blending from pure hovering at zero air speed at which time the control column pitches the aircraft but does not cause it to rise or descend, to pure planing at high speeds in which the control column has its normal airplane-like function.

When the plane is nosed down, it gains speed only a relatively small amount. When the nose is elevated, there is no marked tendency to lose flying speed. Any increase of air speed such as would ordinarily occur in a downwardly curving flight path causes an increase in ram pressure. This action rotates pendulum 26 clockwise, carries electrical contact member 42 to the right, and rotates thrust-directing means 1 through a corresponding angle clockwise. When the original thrusting direction of 1 lies between the forward and the vertically upward directions (as is the case when flying at a forward air speed) such a rotational displacement of the powered thrust increases the lifting component of the thrust and decreases the forward or propelling component. The former action tends to compensate for the decrease of wing lift due to the nose-down change of angle of attack, indirectly acting against further speed increase, and the latter acts directly against such a speed increase. In upwardly-bending flight a similar action occurs, with all the directions reversed.

*Fore-and-aft control.*—Hand-grip buttons 72 and 73 are employed, producing forward and rearward changes of velocity respectively. Pressure on thumb button 72 closes switch 76 and causes electric current to flow which drives motor 61 in a clockwise direction, turning shaft 34 and adjustable control arc 32 in a clockwise direction. Assuming initially for the sake of simplicity that pendulum 26 holds a constant angle relative to the aircraft, contact member 42 moves relatively to the left on adjustable control arc 32, the conductor plate 58 first contacted in the relatively leftward movement of contact member 42 then carries current, energizing the power circuit described above which rotates thrust-director 1 counterclockwise, increasing the forward component of thrust and increasing horizontal velocity. Release of button 72 allows gap 83 to rotate into position to stop the action. When trigger member 73 is pulled, switch 77 closes, and an action results like that just described, but in the opposite directions.

In landing and taking off there may be aerodynamic interactions between the aircraft and the ground which cause the effective thrust direction to rotate forwardly or rearwardly as the distance from the ground changes, even though the aircraft and its power plant remain at constant pitching angle in space. Also there may be changes of wind speed carrying the aircraft away from the hovering spot. The motions of the aircraft which result are corrected by the operation of either 72 or 73 as required. Similarly, ground speeds are controlled conveniently even in varying wind speeds.

*Airspeed stabilization.*—In the process of gaining forward speed in horizontal flight, operation of button 72 first rotates the thrust forward from the vertical through a certain angle. As speed increases, the action of ram on pendulum 26 rotates the thrust back toward its original position, by moving contact member 42 and thruster 1 clockwise on FIGURE 29. The unbalanced thrust component which accelerates the aircraft forward decreases progressively and a speed is reached at which the remaining propulsive component equals the aerodynamic drag of the aircraft. At this air speed the aircraft will remain unless buttons 72 or 73 are operated again, or the amount of the powered thrust resultant is changed by changing power settings. When airspeed tends to decrease the same process operates in reverse, tending to increase airspeed.

Pendulum 26 takes a resultant hanging position determined by the resultant acceleration in the plane normal to its axis of rotation including that of gravity and is prevented from oscillating by viscous damping provided by flotation bearing 29. Hovering flight may be performed satisfactorily with relatively small values of acceleration in the direction of the flight path. The action of horizontal acceleration on pendulum 26 intensifies the controlled thrust change, adding to the unbalanced propulsive force increment whether it acts forward or rearward, tending to increase the existing acceleration in whatever direction it acts. Air speed stabilization by means of the ram feature makes horizontal acceleration effects relatively inconsequential, in that the increased acceleration only hastens the attainment of the stabilized air speed. The effects of horizontal acceleration may be largely erased by the use of a motor 68 having a speed too slow to reproduce sudden accelerative displacements of pendulum 26, but fast enough to follow ordinary pitching rotations of the aircraft. If desirable in a particular design the acceleration effects on the pendulum may be eliminated entirely by the use of a conventional vertically erecting gyroscope as a continuously vertical member, upon which a ram-operated spring restrained vane or other similar pressure-sensing means would be mounted. The thrust actuating element would operate from this ram vane to obtain the air speed stabilizing action. A gyroscope used in this manner could use conventional mounting bearings.

*Flight at high speed.*—At a sufficiently high airspeed pendulum 26 is stopped by ram stop 40. Contact member 42 takes a fixed position relative to fuselage 3 and remains there until the air speed decreases again and allows pendulum 26 to swing free. At all speeds above the ram stop speed, the thrust is tilted as required, by the operation of button 72 or trigger 73, without airspeed stabilization. When the thrust is in the full forward direction, the aircraft operates as a conventional airplane. In a climbing attitude pendulum 26 falls away from the ram stop at a relatively faster air speed than it does in a diving attitude. This is consistent with the needs of the case, as a climbing plane is a plane losing speed which may soon require the action of the invention, whereas a diving plane is a plane gaining air speed, departing from the flight regime in which the invention applies.

The selection of the ram-stop air speed and pendulum angle at which pendulum 26 is removed from action by ram stop 40 is governed by several design considerations. If the ram-stop air speed is too high, the speed stabilizing action will operate across too large a speed range, will be relatively too strong at the higher air speeds and too weak at the slower air speeds. It is possible for the ram-stop air speed to be too slow, for instance, if it were slower than the strongest ground winds likely to be encountered. If ram-stop pendulum angle is too small, the amount that the plane can nose-down in hovering while retaining automatic control will be limited. Also the ram-stop pendulum angle limits the angle through which the thrust is able to elevate automatically when making a running take-off.

*Speed reduction and landing.*—To reduce speed from wing-supported flight, the powered thrust is reduced, the aircraft loses air speed, and the nose is raised by the use of control column 5. Prior to the stall of the wing, the powered thrust is increased and trigger 73 is pulled, elevating the thrust. By means of control column 5 the wing angle of attack is held safely below the stall, and the aircraft may be nosed down if necessary to prevent climbing as the powered thrust contribution to lift increases. The upward and rearward rotation of thrust continues until it inclines rearwardly for deceleration, if necessary. In power-supported flight at small forward speed the aircraft is flown principally by means of control column 5 to obtain the desired elevation above the ground, or to land the aircraft, or forward motion may be made to stop entirely by the further use of trigger 73, whereupon a slight reduction of thrust allows the aircraft to settle to the ground.

*Override circuit.*—FIGURE 29 includes an override circuit permitting the pilot to operate driving motor 68 to rotate thrust-director 1 directly. Switch 78 on handgrip 71 of control column 5 is operated to position 78a closing an electric circuit which energizes dominant solenoid coils $c_1$ and $c_2$ opening switches $b_1$ and $b_2$ thereby opening the circuits through which control arc 32 and contact member 42 operate on motor 68, and also closing a direct circuit which operates motor 68 in a counterclockwise direction. Operation of switch 78 in the opposite direction to position 78b causes motor 68 to rotate clockwise, with results which are identical except for direction. When not forcibly operated, switch 78 maintains a neutral inactive position, by conventional means.

In power-supported aircraft not employing this invention the control of thrust-directing means 1 relative to fuselage 3 would be accomplished by a system of the type represented by the override system.

Thus, failure of any part of the invention which does not affect the primary thrust rotation system, is equal to reverting to the normal situation which would exist without the invention. Although adding new parts which are susceptible of malfunctioning, the invention adds no risks, but on the contrary, for the great bulk of operations in which no malfunctioning would occur, it materially reduces piloting risks through the ease of flight control which it attains.

*Take-off.*—The normal take-off procedure is as follows: If the thrust is forward of vertical, trigger 73 is operated and the thrust rotates rearwardly. It stops automatically at a position normal to the fuselage, by the following action: Control arc 32 rotates counterclockwise until roller 42 makes contact with uniquely wired plate 85. Because the aircraft is on the ground switches 69 and 70 are closed and the automatic stopping circuit is operative; current flows in a portion of the override circuit, energizing solenoid coils $c_1$ and $c_2$, opening switches $b_1$ and $b_2$, stopping motor 68. Since pendulum 26 is vertical, this will occur with the 0° position of control arc 32 vertical. Now referring to FIGURE 9, the position attained corresponds to the position of arrow 13 in solid lines, at which position the thrust is normal to the fuselage. If the thrust is rearward of the normal to the fuselage button 72 is operated and the thrust stops at the normal by the same means. Having set the thrust direction near the vertical, the power is increased until the aircraft rises, whereupon corrections for slope and wind are made as described. NOTE: To set the thrust to the true vertical it is only necessary to know the fuselage inclination angle and to set adjustable control arc 32 in a compensating position.

If the aircraft fails to rise with full thrust output, a running take-off is necessary. The thrust is rotated forward to the horizontal, by first pressing override switch 78 forward and than holding button 72 until the forward rotation ceases, stopped by a limit switch not shown. The powered thrust is then increased to full output, and the aircraft accelerates forward. As speed increases, ram pressure acting on pendulum 26 rotates it clockwise, the thrust rises above the horizontal, producing a component of lift to a degree corresponding to the ability of the planing wing to develop lift through forward air speed, and the two sources of lift act in concert to produce the take-off. By this means the thrust is automatically kept horizontal and accelerates the aircraft so long as the air speed is insufficient to produce significant aerodynamic lift, but it moves toward the vertical to the same degree that that lift becomes available. The pilot need only keep the aircraft on its heading and operate control column 5 in a conventional manner, and the aircraft will perform a take-off in a distance materially shorter than is possible with a thrust direction held constant relative to the aircraft.

When the aircraft is on the ground, the operation of buttons 72 and 73 is automatically interrupted whenever the thrust-directing means reaches the normal. To restore the action of buttons 72 and 73, the pilot may maintain pressure on one of the buttons in the desired direction, and squeezes the opposite button at the same time, temporarily. For instance, thumb button 72 is pushed hard and trigger 73 is lightly squeezed temporarily, pressing 72 and 73 toward each other, interrupting the override circuit and maintaining a closed switch at 76, initiating counterclockwise rotation of thrust director 1.

In summary, a typical take-off and transition are performed as follows: Operate button 72 or 73 until the action stops and the thrust is near vertical. Increase thrust and take-off. When high enough, press the "go" button 72 intermittently and fly with control column 5 in a conventional manner in any desired flight path between the horizontal and a steep climb. Hold the "go" button down until the action stops, at which time the thrust will be straight forward relative to the aircraft, transition will be complete and the invention will be out of action.

It is not intended that the invention be limited to the specific construction described herein but that equivalent means may be substituted for those described.

I claim:

1. In an aircraft for power-supported flight, variable direction thrust means pivotally mounted thereon, a horizontal fuselage mounted thereon, landing members attached to said fuselage for landing in a horizontal attitude, wide angle position sensing means mounted in said fuselage freely rotatable relative to said fuselage, said sensing means including an isolated pendulum member freely pivoted on low friction bearings, said sensing means indicating the vertical direction in space and indicating the angle of displacement of said fuselage from the horizontal position, and driving means actuated by said sensing means driving said variable direction thrust means through an angular range of positions including a position thrusting steeply upward relative to said fuselage and a position thrusting forwardly relative to said fuselage.

2. On an aircraft for power-supported flight, control means including two independent control mechanisms controlling the angular attitudes in space of two different sets of aircraft parts, firstly aerodynamic means mounted on a fuselage controlling said fuselage, and secondly angle sensing means including a pendulum member and rotational driving means mounted in said aircraft controlling thrusting means rotatably mounted on said aircraft.

3. In an aircraft in power-supported flight, piloting controls including a hand grip movable fore and aft relative to said aircraft and an additional member mounted on said hand grip displaceable fore and aft relative to said hand grip, the displacement of said hand grip displacing control system members actuating aerodynamic pitching control means displacing the aircraft in pitch, and the displacement of said additional member actuating driving means displacing thrusting means rotatably mounted on said aircraft.

4. In a vertically rising aircraft having a horizontal fuselage, means mounted in said aircraft for maintaining a vertical direction of powered thrust in space comprising powered thrusting means rotatably mounted on said aircraft, said thrusting means being rotatable through substantially 90 degrees relative to said fuselage and sensing and driving means mounted in said aircraft, said sensing means including an isolated wide angle pendulum member freely pivoted on low friction bearings sensing vertical direction in space and including a member sensing aircraft angular attitude relative to said pendulum member, and said driving means rotating said powered thrusting means relative to said aircraft, said driving means being governed by said sensing means.

5. In a power-supported aircraft having a horizontal fuselage, aerodynamic control means mounted on said fuselage rotating said fuselage in space, variable direction thrusting means rotatably mounted on said fuselage, thrust direction control means mounted in said fuselage rotating said variable direction thrusting means relative to said fuselage, said thrust direction control means including an isolated wide angle pendulum member freely pivoted on low friction bearings on said fuselage, said pendulum member seeking vertical alignment in space, and driving means driving said variable direction thrusting means through a change of angle relative to said aircraft equal and opposite to the change of angle of said aircraft relative to said vertical seeking pendulum member, maintaining thrust vertically in space independently of aircraft attitude, as described.

6. In an aircraft in power-supported flight, a member freely pivoted relative to said aircraft seeking vertical alignment in space, means supplying ram pressure to pressure sensing means, and driving means aligning a powered thrusting means to thrust in a direction displaced from the vertical to a degree corresponding to the magnitude of said ram pressure.

7. In an aircraft for power-supported flight, a freely pivoted member seeking vertical alignment in space, means conducting air pressure due to aircraft air speed to a pressure-displaceable surface attached to said vertical alignment seeking member, said air pressure displacing said surface, a position reference member mounted in said aircraft sensing the position of said displaceable surface relative to said aircraft, said position reference member being controllably displaceable relative to said aircraft, driving means mounted on said aircraft attached to and rotatably driving a powered thrusting means rotatably mounted on said aircraft, and governing means governing said driving means in response to the net additive displacements of said pressure-displaceable surface and said controllably displaceable position reference member.

8. In an aircraft for power-supported flight a thrusting means mounted rotatably in pitch on said aircraft, a driving means attached to said thrusting means rotating said thrusting means relative to said aircraft between a forwardly thrusting direction and an upwardly thrusting direction, pressure-actuated governing means employing ram pressure due to forward airspeed governing said driving means, said driving means so governed changing the angle of position in rotation in pitch of said thrusting means in response to a change of airspeed of said aircraft.

9. In an aircraft for power-supported flight having a horizontal fuselage means for guiding and directing powered thrust-producing reaction gases, said gas-directing means being mounted on said aircraft rotatably in pitch, driving means attached to said gas-directing means rotating said gas-directing means between a position producing a forward thrust and another position producing an upward thrust, governing means mounted in said aircraft employing an isolated pendulum member freely mounted on low friction bearings, said pendulum governing said driving means, said driving means so governed changing the angle of position in rotation in pitch of said gas-directing means relative to said aircraft in compensation for a change of angle of pitch of said aircraft, whereby the thrust direction remains constant in space despite pitching displacements of the aircraft, as described.

10. In an aircraft for power-supported flight, variable direction thrust means pivotally mounted thereon, a fuselage mounted thereon, landing members attached to said fuselage, angular position sensing means mounted in said fuselage freely rotatable relative to said fuselage, said sensing means including a pendulum member, said sensing means indicating the vertical direction in space and indicating the angle of displacement of said fuselage relative to said vertical direction, driving means actuated by said sensing means driving said variable direction thrust means in rotatable angular relationship to said fuselage, and pilot control adjustment means mounted on said fuselage co-operative with said angular position sensing means, said control adjustment means modifying the indication of the fuselage displacement angle relative to the vertical direction as otherwise indicated by said angular position sensing means, whereby the direction of thrust of said variable direction thrust means is controlled by the pilot, as described.

11. In an aircraft for power-supported flight, variable direction thrust means pivotally mounted thereon, a fuselage mounted thereon, landing members attached to said fuselage, angular position sensing means mounted in said fuselage freely rotatable relative to said fuselage, said sensing means including a pendulum member, said sensing means indicating the vertical direction in space and indicating the angle of displacement of said fuselage relative to said vertical direction, driving means actuated by said sensing means driving said variable direction thrust means in rotatable angular relationship to said fuselage, and ram pressure means co-operative with said angular position sensing means, said ram pressure means modifying the indication of said vertical direction in space as otherwise indicated by said angular position sensing means, whereby the direction of thrust of said variable direction thrust means is changed by changes of airspeed, as described.

12. In a vertically rising aircraft, variable direction thrust means pivotally mounted thereon, a fuselage mounted thereon, landing members attached to said fuselage, angular position sensing means mounted in said fuselage freely rotatable relative to said fuselage, said sensing means including a pendulum member, said sensing means indicating the vertical direction in space and indicating the angle of displacement of said fuselage relative to said vertical direction, adjustable controlling means mounted on said fuselage modifying the indication of the fuselage displacement angle relative to the vertical direction as otherwise indicated by said angular position sensing means, pilot-operated driving means rotating said variable direction thrust means relative to said fuselage, stopping means stopping the pilot-operated rotation of said thrust means at a position relative to said fuselage governed by said sensing means and said adjustable controlling means in co-operation, switch means operated by the pressure of the ground against said aircraft rendering said stopping means operative, and additional pilot-operated means overcoming the action of said stopping means and restoring said pilot-operated driving means.

13. In a vertically rising aircraft having a horizontal fuselage, a wide angle attitude sensing means mounted in said aircraft, said sensing means including an isolated vertically-aligning pendulum member freely mounted on low friction bearings, powered thrusting means pivotally mounted on said aircraft rotatable between a perpendicularly thrusting position and a forwardly thrusting position relative to said fuselage, and driving means actuated by said attitude sensing means driving said powered thrusting means to thrust in a direction parallel to said vertically aligning pendulum member.

14. On an aircraft for power-supported flight, thrust-directing means mounted rotatably in pitch on said aircraft, driving means attached to said thrust-directing means rotating said thrust-directing means between a forwardly thrusting position and an upwardly thrusting position, governing means mounted in said aircraft employing an isolated pendulum member freely mounted on low friction bearings, said pendulum member governing said driving means, said driving means so governed changing the angle of position in rotation in pitch of said thrust-directing means relative to said aircraft in compensation for a change of angle of pitch of said aircraft thereby maintaining the thrust direction constant in space, and adjustable controlling means mounted in said aircraft employing a position reference member adjustably displaceable relative to said pendulum member, said adjustable position reference member additionally controlling said driving means, said driving means so controlled changing the angle of position in rotation in pitch of said thrust-directing means, thereby producing changes of horizontal velocity of the aircraft, as described.

15. In an aircraft for power-supported flight, a laterally transverse pivot member, a horizontal fuselage rotatably mounted on said laterally transverse pivot member, a powered thrusting means rotatably mounted on said laterally transverse pivot member, said thrusting means thrusting steeply upward relative to said fuselage, wide angle sensing means mounted in said aircraft sensing changes of pitch attitude in space of said thrusting means, said sensing means including an isolated pendulum member freely mounted on low friction bearings, and driving means attached to said rotatable thrusting means driving said thrusting means through changes of pitch attitude in space equal to and opposite from the changes of pitch attitude sensed by said sensing means.

16. In a vertically rising aircraft having a horizontal fuselage, means mounted in said aircraft for maintaining a vertical direction of powered thrust in space comprising powered thrusting means rotatably mounted on said aircraft, and sensing and driving means mounted in said aircraft, said sensing means including an isolated wide angle pendulum member freely pivoted on low friction bearings sensing the vertical direction in space and including a member sensing aircraft angular attitude relative to said pendulum member, said driving means rotating said powered thrusting means relative to said aircraft, said driving means being governed by said sensing means, and adjustable controlling means for selecting and maintaining various positions of said powered thrusting means at constant angles in space from the vertical direction, including a controllable positioning member adjacent to said sensing means adjustable in position relative to said aircraft.

References Cited in the file of this patent

UNITED STATES PATENTS

| | | |
|---|---|---|
| 1,065,656 | Benni | June 24, 1913 |
| 1,838,354 | Bauer | Dec. 29, 1931 |
| 2,465,457 | Johnston | Mar. 29, 1949 |
| 2,552,359 | Winslow | May 8, 1951 |
| 2,567,392 | Naught | Sept. 11, 1951 |
| 2,621,871 | Robert | Dec. 16, 1952 |
| 2,756,114 | Brunzel | July 24, 1956 |
| 2,756,115 | Michel | July 24, 1956 |
| 2,762,584 | Price | Sept. 11, 1956 |

FOREIGN PATENTS

| | | |
|---|---|---|
| 160,981 | Australia | Feb. 8, 1955 |